US008370977B2

(12) United States Patent

Newkirk et al.

(10) Patent No.: US 8,370,977 B2

(45) Date of Patent: Feb. 12, 2013

(54) LINE MANAGEMENT DEVICE FOR A HOSPITAL BED

(75) Inventors: David C. Newkirk, Lawrenceburg, IN (US); Richard H. Heimbrock, Cincinnati, OH (US); James L. Walke, Batesville, IN (US); Robert A. Till, Jr., Avon, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 12/826,886

(22) Filed: Jun. 30, 2010

(65) Prior Publication Data

US 2010/0263123 A1 Oct. 21, 2010

Related U.S. Application Data

(63) Continuation of application No. 11/672,691, filed on Feb. 8, 2007, now Pat. No. 7,766,289.

(60) Provisional application No. 60/771,318, filed on Feb. 8, 2006.

(51) Int. Cl.

| | |
|---|---|
| ***A47C 31/00*** | (2006.01) |
| *A47B 71/00* | (2006.01) |
| *A47C 21/00* | (2006.01) |
| *F16M 11/00* | (2006.01) |

(52) U.S. Cl. ............... 5/658; 5/600; 5/503.1; 248/176.1

(58) Field of Classification Search ........... 5/658, 503.1, 5/600; 604/174, 179; 248/51, 52, 74.1

See application file for complete search history.

(56) References Cited

U.S. PATENT DOCUMENTS

| | | | |
|---|---|---|---|
| 1,739,910 | A | 12/1929 | Livergood |
| 1,783,278 | A | 12/1930 | Brady |
| 2,449,882 | A | 9/1948 | Daniels |
| 2,913,740 | A | 11/1959 | Eldridge |
| 3,210,816 | A | 10/1965 | Clemons |
| 3,312,434 | A | 4/1967 | Simon |
| 3,338,538 | A | 8/1967 | Roche |
| 3,991,960 | A | 11/1976 | Tanaka |
| 4,023,757 | A | 5/1977 | Allard et al. |
| 4,141,524 | A | 2/1979 | Corvese, Jr. |
| 4,262,872 | A | 4/1981 | Kodet |
| D260,850 | S | 9/1981 | Greenblatt |
| D263,624 | S | 3/1982 | Stenzler et al. |
| 4,702,443 | A | 10/1987 | Callaway |
| 4,705,243 | A | 11/1987 | Hartmann et al. |
| 4,770,377 | A | 9/1988 | Callaway |
| 4,795,429 | A | 1/1989 | Feldstein |
| 4,988,062 | A | 1/1991 | London |
| 5,102,399 | A | 4/1992 | Chu |
| 5,224,674 | A | 7/1993 | Simons |
| 5,226,892 | A | 7/1993 | Boswell |
| 5,306,266 | A | 4/1994 | Freeland |
| 5,323,992 | A | 6/1994 | Sifers et al. |
| 5,334,186 | A | 8/1994 | Alexander |
| 5,361,756 | A | 11/1994 | Cernosek et al. |
| 5,427,338 | A | 6/1995 | Garrett et al. |
| 5,535,787 | A | 7/1996 | Howell |
| D378,408 | S | 3/1997 | Pyeatt et al. |
| 5,624,403 | A | 4/1997 | Jaquith |
| D379,509 | S | 5/1997 | Macko |
| 5,628,141 | A | 5/1997 | Crawford |
| 5,735,822 | A | 4/1998 | Steins |
| 5,836,453 | A | 11/1998 | Herrera |

(Continued)

*Primary Examiner* — J. Liu

(74) *Attorney, Agent, or Firm* — Barnes & Thornburg LLP

(57) ABSTRACT

A patient line management device to manage one or more patient care lines is provided. The line management device includes a line manager coupled to a support. The support is adapted to be coupled to a patient support such as a hospital bed.

20 Claims, 7 Drawing Sheets

U.S. PATENT DOCUMENTS

| | | | |
|---|---|---|---|
| 5,918,837 | A | 7/1999 | Vicain |
| 6,145,253 | A | 11/2000 | Gallant et al. |
| 6,196,503 | B1 | 3/2001 | Cernosek et al. |
| 6,336,897 | B1 | 1/2002 | Mackin |
| 6,345,873 | B1 | 2/2002 | Kim |
| 6,375,006 | B1 | 4/2002 | Samuels |
| 6,375,017 | B1 | 4/2002 | Schattner et al. |
| 6,382,568 | B1 | 5/2002 | Snell |
| 6,526,610 | B1 | 3/2003 | Hand et al. |
| D479,328 | S | 9/2003 | Reynolds et al. |
| 6,854,694 | B1 | 2/2005 | Van Etten |
| D503,231 | S | 3/2005 | Daugherty |
| 6,862,759 | B2 | 3/2005 | Hand et al. |
| 6,874,181 | B1 | 4/2005 | Connolly et al. |
| 7,007,908 | B2 | 3/2006 | Tsay |
| 7,083,150 | B2 | 8/2006 | Newkirk et al. |
| 7,766,289 | B2 | 8/2010 | Newkirk et al. |
| 2001/0028021 | A1 | 10/2001 | Martin |
| 2002/0047075 | A1 * | 4/2002 | Metz et al. ................. 248/229.1 |
| 2003/0052787 | A1 | 3/2003 | Zerhusen et al. |
| 2004/0060111 | A1 * | 4/2004 | Alverson .......................... 5/425 |
| 2004/0177445 | A1 | 9/2004 | Osborne et al. |
| 2004/0186341 | A1 | 9/2004 | McDermott |
| 2005/0081296 | A1 | 4/2005 | Dawes |
| 2006/0162068 | A1 * | 7/2006 | Risk et al. ........................ 5/53.1 |
| 2006/0249635 | A1 | 11/2006 | Newkirk et al. |
| 2007/0181751 | A1 | 8/2007 | Newkirk et al. |

* cited by examiner

LINE MANAGEMENT DEVICE FOR A HOSPITAL BED

CROSS-REFERENCE TO RELATED APPLICATIONS

This application is a continuation of U.S. application Ser. No. 11/672,691, filed Feb. 8, 2007, now U.S. Pat. No. 7,766,289, which claims the benefit of U.S. Provisional Patent Application 60/771,318, filed Feb. 8, 2006, each of which is hereby incorporated in its entirety herein by this reference.

BACKGROUND

Patients can be located in a health care facility, such as a hospital, in home care, or in other known patient care settings. Such patients often require patient care equipment to be in close proximity to receive medical care. Such patient care equipment may include heart monitoring equipment, medical gas delivery equipment, infusion pumps, intravenous bags, equipment monitors, defibrillators, and other patient care equipment, many of which directly connect to the patient via lines, cables, or tubes.

Intravenous lines, tubes, wires and the like have in some instances been left to dangle or hang between patient care equipment and the patient without intermediate support. Moreover, many of these lines are put into place or connected to the patient's body prior to the patient being transported. When the patient is being adjusted or moved, however, it is possible for these lines to become displaced or entangled, thereby compromising the ability of the attending caregivers to adequately treat the patient.

Sometimes the lines or tubes are secured to a structure by a fastener, tape, or other means. Such placement is intended to prevent unintentional movement of the lines or tubes, for example to prevent a caregiver from tripping over or snagging one of the lines or tubes. The structure to which the lines or tubes are secured can include a patient support device, a floor, a wall, an equipment support, or any other device which is intended to prevent or reduce accidental movement of the lines or tubes.

SUMMARY OF THE INVENTION

The present invention comprises one or more of the following features or elements in the appended claims or combinations thereof.

The present disclosure relates to a device for organizing and managing patient lines such as IV lines, tubes, wires for sensors, monitors and vents, etc., and particularly to a device coupled to a patient support for managing patient lines extending from the patient support to patient care equipment.

In one embodiment of the present invention there is provided a line management device to support one or more patient care lines adapted to extend from a patient supported by a patient support. The line management device includes a support body, including a coupler to couple the support body to the patient support, the support body including a centerline, and a line manager. The line manager is coupled to the support body, the line manager including a body, a plurality of upwardly extending fingers extending from the body, at least one of the upwardly extending fingers being substantially parallel to the centerline, and a plurality of channels located between the upwardly extending fingers, wherein the plurality of channels is one less than the plurality of fingers.

In another embodiment of the present invention, there is provided a line management device to support one or more patient care lines adapted to extend from a patient supported by a patient support. The line management device includes a support body, including a coupler to couple the support body to the patient support, the support body being flexible and having a first and a second position, the second position being determined by an external force, wherein the flexible body when moved from the first position to the second position remains at the second position upon removal of the external force, and a line manager. The line manager is coupled to the support body. The line manager is flexible and includes a first position and a second position, the second position being determined by an external force, wherein the flexible body when moved from the first position to the second position returns to the first position upon the removal of the external force.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

Aspects of the present invention are more particularly described below with reference to the following figures, which illustrate exemplary embodiments of the present invention, wherein.

DETAILED DESCRIPTION OF THE DRAWINGS

The embodiments of the present teachings described below are not intended to be exhaustive or to limit the invention to the precise forms disclosed in the following detailed description. Rather, the embodiments are chosen and described so that others skilled in the art may appreciate and understand the principles and practices of the present teachings.

Initially, it is noted that the words "tube", "line", and "patient care line" as used herein are intended to refer generally to any conduit or electrical wire that could be used in a medical setting or a patient care environment including, but not limited to IV tubes, sensor wires, oxygen-, gas-, or fluid-carrying tubes and the like. Furthermore, the words "tube," "line," and "patient care line" may be used interchangeably and still refer generally to the definition described above.

Generally, the present invention provides a bed having a headboard with a line management device for handling of patient care lines, particularly when transporting the patient or adjusting the bed between a supine support position and a prone support position. To accomplish this, the line management device includes a line manager having a plurality of flexible channels or grommet adapted to receive patient lines and tubes that extend between the patient and the medical care equipment. The line management device can remain stationary when fixed to a portion of the frame which does not move with movement of a patient being articulated. In addition, the line manager can be placed so the lines can travel with the upper torso of the patient during bed movement thereby helping to maintain line integrity between the patient and the associated equipment (e.g., IV pumps, monitors, vents, etc.). As such, the risk of entanglement or dislodgement of the patient care lines can be reduced or minimized since the lines are securely supported by the guide means during transport of the patient or rotation of the patient support platform.

Figure 1:
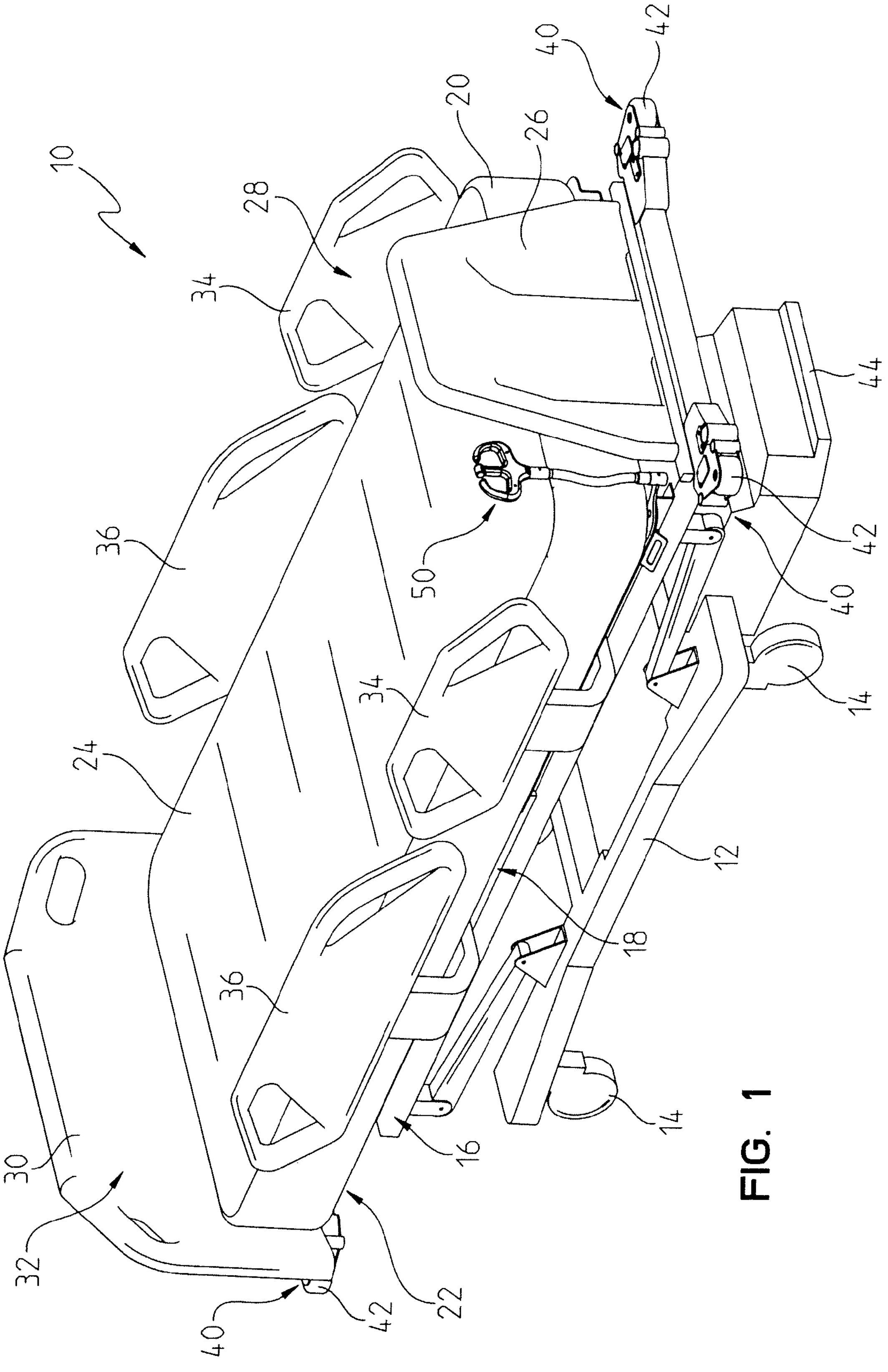
FIG. 1 is a perspective view of an illustrative embodiment patient support including a line management device according to the present invention.

FIG. 1 illustrates a patient support 10 including a base frame 12 supported by a plurality of casters 14. An intermediate frame 16 is supported by the base frame 12 and is coupled to an articulating support deck 18 (not shown). The support deck 18 is of a conventional design and includes a plurality of sections configured to articulate relative to one another. Articulating support decks typically include a head section, a seat section, and a foot section. In addition, it is also possible that the articulating support deck 18 can include a thigh section coupled intermediate a seat section and a foot section.

Located on the articulating support deck 18 is a mattress 20 which can include mattresses made of foam, air bladders or cushions, or a combination thereof. The mattress 20 or support surface 20 also includes a bottom 22 which is supported by the articulating deck 18 and a top surface 24 which is used to support a patient. Typical mattress thicknesses can range from approximately six to nine inches or more.

A headboard 26 can be mounted to either the intermediate frame 16 or to the articulating support deck 18. The headboard 26 is mounted adjacent a head end 28 of patient support 10. A foot board 30 can be mounted to the intermediate frame 16 or to the articulating support deck 18 of the patient support 10 at a foot end 32 of the patient support 10. The patient support 10 further includes a pair of head end side rails 34 and a pair of foot end side rails 36. The foot end side rails 36 and the head end side rails 34 can be coupled to the articulating support deck 18. Such side rails, however, may also be coupled to the intermediate frame 16. The patient support 10 also includes a plurality of bumpers 40 located at the respective corners of the patient support. Bumpers 40 include rollers 42 which can provide protection to the walls or other structures and/or equipment found in a hospital if the patient support 10 contacts such structures or equipment. In addition, the patient support 10 can include a propulsion system 44 to provide for powered movement of the patient support when required, as is understood by those skilled in the art.

Located at the head end 28 of the patient support 10 is a line management device 50. The line management device 50 provides for the support and/routing of one or more patient care lines which extend from a patient supported on the surface 24 to a variety of known medical care devices, including medical equipment and medical supplies. Such patient care lines can include air supply lines, medicine supply lines, feeding tubes, suction lines, IV infusion lines, and equipment monitoring lines. Such lines are exemplary only, and the line management device 50 can support other lines as well.

Figure 2:
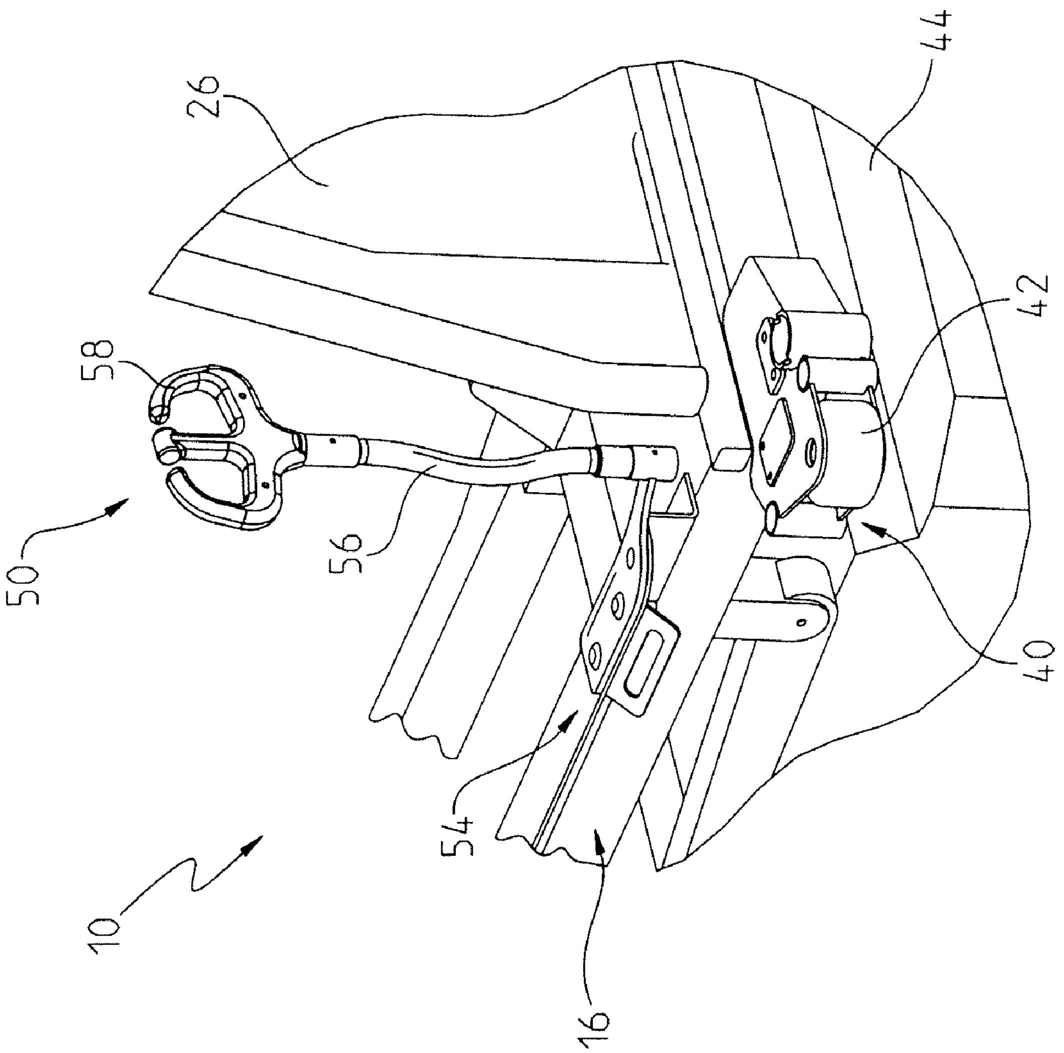
FIG. 2 is a partial perspective view of the embodiment of FIG. 1 according to the present invention.

FIG. 2 illustrates a perspective view of a portion of the patient support 10 not including the mattress 20. As illustrated in FIG. 2, the line management device 50 includes a support assembly 54 which is attached to a portion of the intermediate frame 16, as illustrated. It is also within the scope of the present invention to couple the support assembly 54 to the articulating support deck 18. The support assembly 54 extends from the portion of the frame to which it is coupled to support a support body 56 which is coupled to a line manager 58. The line manager 58 is used to capture and to direct the one or more patient care lines which extend from the patient to the previously described medical care devices and/or equipment. In one embodiment, the surface of the support body closest to the mattress is substantially parallel with the surface of the footboard closest to the mattress.

Figure 3B:
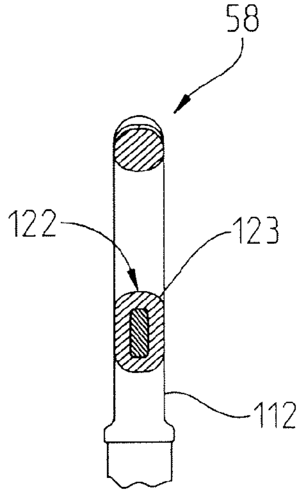
FIG. 3B illustrates a cross-sectional view along a line 3B-3B of FIG. 3A.
Figure 3A:
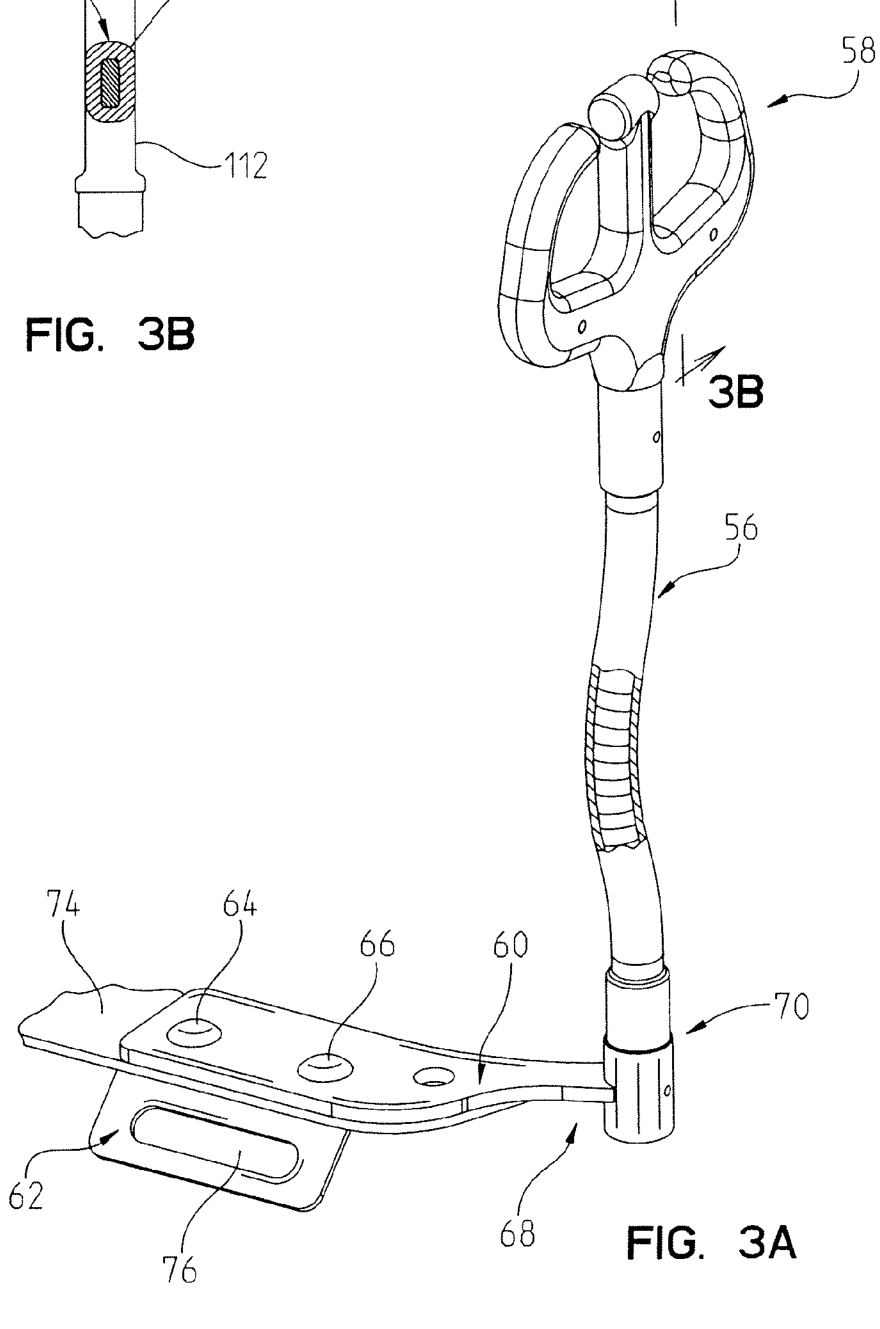
FIG. 3A illustrates a perspective view of a line management device of the present invention.

As illustrated in FIG. 2, the line management device 50 includes the support assembly 54. The support assembly 54 includes a support bracket 60 and a support plate 62 which are coupled together by a first and a second coupler 64 and 66 respectively as shown in FIG. 3A. The support bracket 60, also known as a horizontally projecting support, includes an extension portion 68 which enables the support body 56 to be spaced from the frame and/or the mattress. The support bracket 60 is substantially horizontal with respect to the frame of the intermediate frame 16, since the intermediate frame 16 remains substantially horizontal with the floor. However, if the bracket 60 is coupled to the articulating deck, the bracket 60 moves with movement of the articulating deck.

The extension 68 terminates in a socket 70, or fitting, which receives a portion of the support body 56. The socket 70 is substantially cylindrical in shape and defines a channel which extends therethrough. The socket 70 includes an aperture 72 which can be threaded to receive a threaded pin, or stop (not shown) to fix the position of the body 56 with respect to the assembly 54. Since the channel extends completely through the socket, the bracket can be mounted on either side of the bed by appropriately turning the bracket to a desired side.

To couple the line management device 50 to the patient support 10, the support bracket 60 is placed above a portion of the frame 74. The support plate 62 is located beneath the portion of the frame 74. The support bracket 60 and the support plate 62 are coupled together with couplers 64 and 66 which are inserted through at least one aperture in the support bracket, one or more apertures in the portion of the frame 74, and at least one aperture in the support plate 62. A slot 76 is formed in the support plate 62 and is adapted to receive a patient restraint such as a belt or web, to restrain a patient on the patient support 10, as is known by those skilled in the art.

Figure 4:
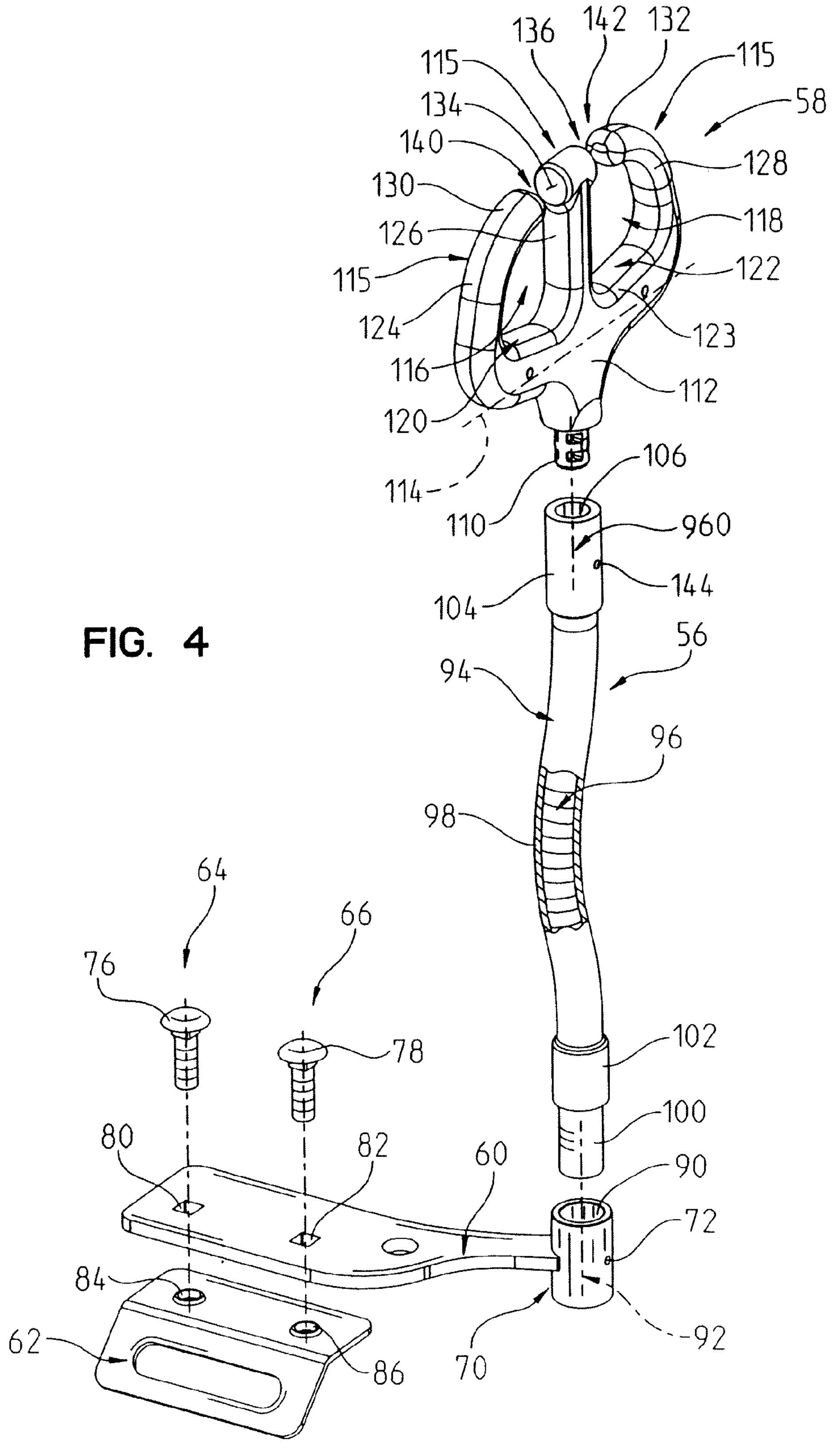
FIG. 4 illustrates an exploded perspective view of a line management device of the present invention.

As further illustrated in FIG. 4, the apertures of the support bracket 60 and the support plate 62 are illustrated to receive the couplers 64 and 66. The couplers 64 and 66 can include first and second carriage bolts 76 and 78 which extend respectively through substantially square apertures 80 and 82 and furthermore extend through apertures 84 and 86 of support plate 62. While not shown, carriage bolts 76 and 78 can include threads which receive a threaded nut for securing the support assembly 54 to the frame portion 74. Other couplers within the scope of the present invention include screws and welding. While the support assembly 54 is intended to be retrofit to existing beds, the assembly 54 can also be used as new production. It is also possible to weld or otherwise permanently fix the given assembly, or one of alternative configurations providing the same or similar cylindrical socket, to new production. Other shapes of sockets are also possible including those having rectangular, oval or other cross-sections.

In the exploded perspective view of FIG. 4, a channel 90 of the socket 70 can be seen. The socket 70 includes an axis 92 which is substantially perpendicular to the plane of the support bracket 60. Because the support bracket 60 is coupled to the frame portion 74, the axis 92 is substantially perpendicular to the frame. In the case of coupling the support bracket 60 to the articulating deck, the axis 92 will be substantially perpendicular to not only the surface of the articulating deck but also to the top surface 24 of the mattress 20.

The support body 56 includes a flexible post 94 having a centerline. The flexible post 94 when positioned or adjusted to be substantially straight includes a center axis 960 which is substantially aligned with the center axis 92 of the socket 70. The flexible post 94 can include a flexible arm 96 which is also known as a "flex arm" or a "goose neck". Such a flex arm is available from Moffatt Products, Inc. of Watertown, S. Dak. In one embodiment, the flexible arm is approximately nine inches long and includes a minimum bend radius of 1.5 inches.

The flexible arm 96 is covered with a plastic coating 98 which is molded over the flexible arm 96, which is typically made of steel. The plastic material can include any number of known plastics, including nylon. The flexible post 94 includes a neck portion 100 having a diameter sufficiently sized to be inserted in the channel 90 of the socket 70. A stop 102 is coupled to or incorporated into the flexible post 94 to prevent the flexible post 94 from being inserted into the socket 70 at an inappropriate depth. While the stop 102 can include a sleeve of material which is fixed to the coating 98 of the flexible post 94, it is within the scope of the present invention to mold the stop 102 during the molding of the nylon coating 98 over the flexible arm 96. While the insertion depth of the neck 100 into the socket 70 is limited by the stop 102, it is possible to adjust the height of the line manager 58 above the top surface 24 of the mattress 20 with the use of a pin being inserted into the aperture 72 and fixed or tightened to appropriately locate the flexible post 94 within the socket 70. The support body can be moved from a first position to a second position by an external force. Upon removal of the force, the support body remains at the second position.

At an end of the flexible post 94 opposite the neck 100, a receiving portion 104 includes a channel 106. The receiving portion 104 can be a separate piece, such as a cylindrical tube which is fixed to the flexible post 94 by a glue or other known means of attachment. In addition, the receiving portion 104 may also be formed during a molding process which is used to create the flexible post 94. For instance, the flexible arm 96 can be placed in a mold into which nylon is injected for creating the described features of the flexible post 94. Consequently, the flexible post 94 can be insert molded in a "one-shot" molding process as is known by those skilled in the art. It is also possible to make the flexible post entirely of one or more plastic materials, such as nylon.

The line manager 58 is supported and held by the flexible post 94 such that the patient lines at the line manager 58 are positioned at or above the top surface 24 of the mattress 20. The line manager 58 includes a neck 110 which is inserted into the channel 106. The neck 110 extends from a body portion 112 of the line manager 58. An axis 114 of body portion 112 extends substantially perpendicular to the axis 96. A plurality of fingers 115 extend from the body portion 112. The plurality of fingers 115 are used to create a first channel 116 and a second channel 118. Each of the first and second channels 116 and 118 include respectively a first bottom portion 120 and a second bottom portion 122 having a thickness or depth defined between a first side and a back side of the manager 58.

The first and second bottom portions 120 and 122 can define a support surface having a curve, such as a portion of a substantially oval or elliptical shape 123. (See FIG. 3B for a cross-sectional view.) In addition, the distance from the front surface to the back surface of the line manager includes approximately five-eighths (5/8) inch or more. By providing a support surface at the first and second bottom portions 120 and 122 having a curved shape, lines which may be pulled through the channels 116 or 118, are less likely to be caught or stopped by the line manager 58. For instance, if a stop cock attached to a line were to be pulled against the line manager, the elliptical surface and/or the bending or deflection of the flexible post tends to reduce the likelihood of the line being caught. By having the front edge and the back edge of the surface lower than the middle portion of the surface, the lines are less likely to be caught. The first and second bottom portions can support the plurality of patient lines which may or may not be of the same type.

The plurality of fingers 115 includes a first finger 124, a second finger 126 and a third finger 128. The first finger 124 and the third finger 128 include respectively an extending portion 130 and 132 which extend towards the second finger 126. The second finger 126 includes extending portions 134 and 136 which extend respectively approximately three-eighths (3/8) of an inch towards the extending portions 130 and 132. The second finger 126 includes a centerline substantially aligned with the centerline of the flexible post 94. The remaining fingers have centerlines substantially parallel to the centerline of the second finger 126. Consequently, adjacent extending portions of either the first finger 124 and the second finger 126 or the second finger 126 and the third finger 128 define a gap 140, or a gap 142. Each of the gaps 140 or 142 provides an access opening to the corresponding first channel 116 or the second channel 118. As can be seen, the first and second bottom portions 120 and 122 slope downwardly toward the second finger 126.

The line manager 58 is formed of a flexible material such that the gap 140 or 142 can be made larger by bending the first finger 124 away from the second finger 126 or the third finger 128 away from the second finger 126. The line manager and in particular one or more of the fingers can be more from a first position to a second position by the application of an external force. Upon removal of the force, the line manager returns to the second position. The thickness or cross-section of the second finger is also larger than the thickness or cross-section of the first and third fingers such that the second finger bends less than the first or third fingers.

The line manager 58 can include a molded part having an inner portion made of a first material and a second or outer portion made of a second material. The first material can include a flexible and/or resilient material, such as nylon. The line manager 58 can be made in a "two-shot" molding process wherein the inner portion is initially formed to include a neck, a base, and first, second and third fingers. During the second part of the molding process an outer covering is placed on the inner portion such that the outer covering can provide a smooth, resilient, impermeable caster cover to provide a relatively easy to clean surface due to the non-absorptive properties of the materials used. The outer covering can include known plastics such as urethane. The outer covering is thinner than the thickness of the inner portion. In one embodiment, the inner portion is approximately at least two times as thick as the inner portion. In addition, the inner portion can be made of a material which is less flexible than the outer covering.

In one example of the line manager 58, the gap 140 and the gap 142 respectively can include a spacing of between 0.125 and 0.187 inches. When the finger 124 is moved away from the finger 126, the gap can be increased to approximately 0.75 inches or more. The force required to open the gap is preferably to be a maximum of 5.0 pounds to achieve the 0.75 inch gap opening. While the described embodiment can include such dimensions, other dimensions are within the scope of the present invention. Such dimensions can be selected as a function of the number and types of patient lines being supported by the line management device 50.

In one example of the line manager 58, the first channel and the second channel can include an inside dimension of approximately two inches along the base and two inches along the sides defined by the upstanding fingers. These dimensions can be greater than the thickness or depth of the bottom portions. Consequently, the channel is adapted to receive a plurality of and a variety of patient lines. For instance, it is within the scope of the present invention for one of the channels 116 or 118 to hold as follows: up to four monitor lines of ⅛" diameter or more; up to two suction lines of ½" diameter or more; up to two oxygen lines of ⅜" diameter or more; up to eight infusion lines of ¼" diameter or more; and up to one feeding tube of ⅜" diameter or more.

In addition, the line manager 58 is adapted to accommodate a variety of combinations of the previously described patient line types. Because the channels have a dimension which is larger than the associated gap, it is possible to remove a single line from a number of lines within a single channel without having to remove other lines from the channel before the desired single line can be removed. Consequently, the present invention allows the removal of individual lines without requiring the removal of other lines being managed.

While the line manager 58, as illustrated includes a neck 110 which is press fit into the channel 106, the neck 110 can include a length sufficient to be received by the channel 106 such that an aperture 144 of the receiving portion 104 can be adapted to receive a stop or threaded screw such that it can hold the line manager 58 at a selected location.

Because both the socket 70 and the retaining portion 104 include apertures for set screws, it is possible to adjust the position of the bottom portions 120 and 122 at a desired location above the top surface 24 of the mattress 20. For instance, in one embodiment of the present invention, it is possible to locate the bottom portions 120 and 122 above the top surface 24 in a range of approximately between 0.5 and 2.5 inches above the top surface 24. In another embodiment, the line manager height can be fixed as desired by taking into account the known mattress thickness or thicknesses. Also, since the flexible post 94 includes the flexible arm 96, the line manager 58 can be positioned in a variety of desired positions and locations.

Figure 5:
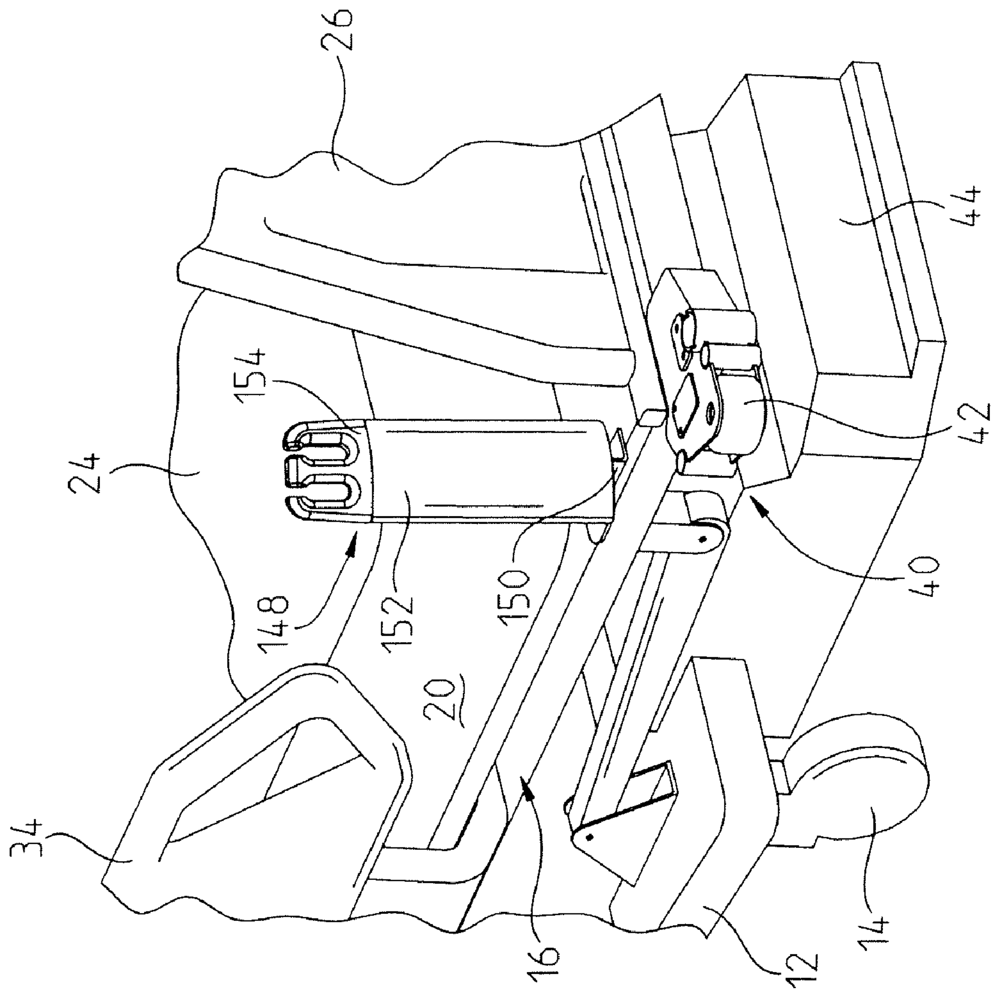
FIG. 5 illustrates another embodiment of a line management device of the present invention.

FIG. 5 illustrates another embodiment of a line management device 148. The device 148 includes a support bracket 150 which can be coupled to the intermediate frame 16, but which can also be coupled to the articulating support deck 18. The bracket 150 is also coupled to an L-shaped portion 152 of the line management device 148. The L-shaped portion 152 can be formed of an L-shaped metal, such as steel, which is coupled to a line manager 154. To form the line management device 148 of FIG. 5, the metal structure is placed inside a plastic injection mold. The plastic is injected into the mold around the metal to form the covering of the L-shaped portion 152 as well as to simultaneously form the line management device 148. The injected nylon is molded over the metal skeleton and provides for the line management device. In using the metal substructure of L-shaped portion 152, the line management device can be formed as a "one-shot" molded plastic part. The use of a metal substructure can provide a substantially rigid line management device.

Figure 6:
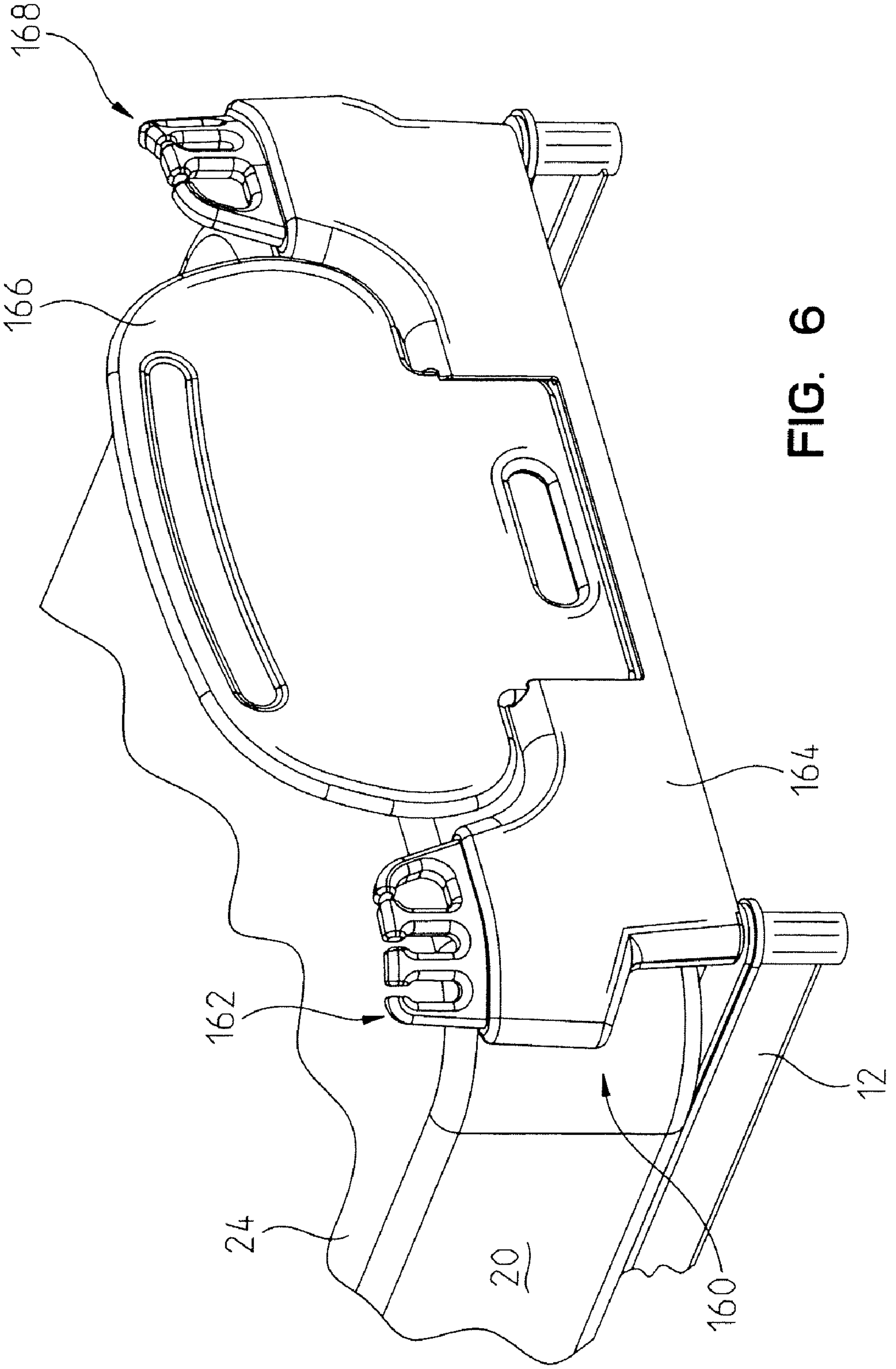
FIG. 6 illustrates another embodiment of a line management device with a removable CPR board.

FIG. 6 illustrates a line management device 160 including a line manager 162. In this particular embodiment, the support body which was previously provided as support body 56 (see FIG. 3) is in this embodiment provided by a headboard 164 including a detachable CPR board 166. The headboard 164 is coupled to either the intermediate frame 16, as illustrated, or to the articulating deck 18. When the headboard 164 is supported by the articulating deck 18, the line manager 162 moves along with the articulating deck. As can be seen in FIG. 6, the headboard 164 not only supports the line manager 162 but also a second line manager 168.

Figure 7:
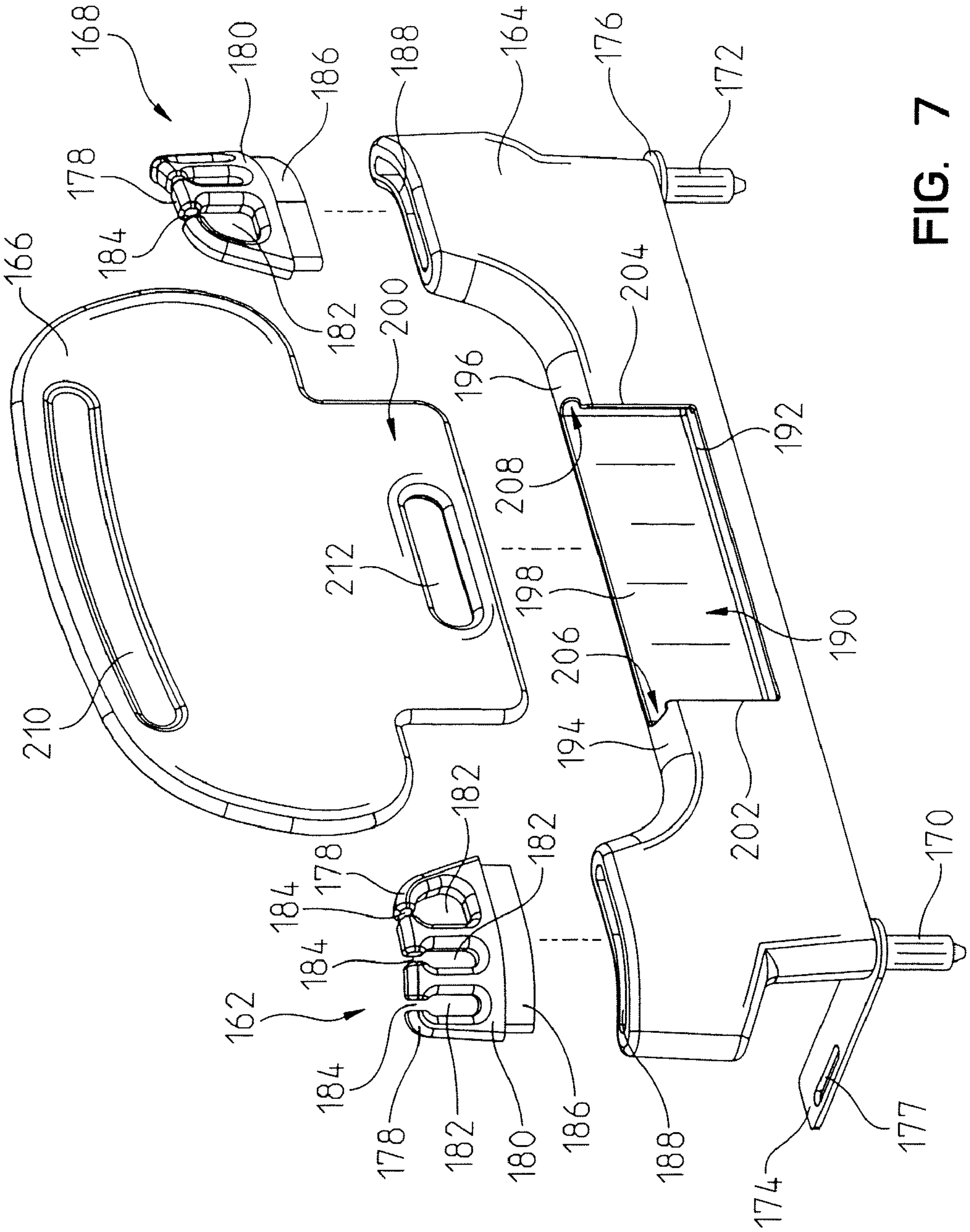
FIG. 7 illustrates an exploded perspective view of a line management device with removable CPR board as illustrated in FIG. 6.

As further illustrated in FIG. 7, the headboard includes first and second couplers 170 and 172. The first and second couplers are inserted into corresponding receptacles located on either the intermediate frame 16 or the articulating deck 18. The couplers include 174 and 176. The brackets can include a slot 177 as previously described.

This illustrated embodiment of the line managers 162 and 168 each includes four fingers 178 extending upwardly from a base portion 180. Each of the fingers 178 define with the base portion 180 a plurality of channels 182 as previously described. As can be seen, the number of channels is typically one less than the number of fingers. Also, as previously described, each of the fingers 178 includes an extending portion which extends toward an adjacent finger to define therebetween a gap 184. Extending downwardly from the base portion 180 is a neck 186 which cooperates with an aperture 188 formed in the headboard 164. The neck 186 can be formed to fit snugly within the aperture 188 such that a press fit can be made or with set screws or other holding devices as previously described. Consequently, the headboard 164 defines the support structure for locating the line manager at a desired height with respect to an adjacent mattress and the top surface thereof.

The headboard 164 includes a receptacle 190 having a bottom portion 192 and a first side portion 194 and a second side portion 196. The receptacle 190 includes a back surface 198. The removable CPR board 166 includes a first portion or downwardly extending portion 200 which is sized to fit within the receptacle 190. As can be seen, the left side portion 194 and the right side portion 196 include extending portions 202 and 204 respectively to define channels 206 and 208. Consequently, the extending portion 200 can be inserted into the receptacle 190 and held therein due to a fit of the extending portion 200 and the channels 202 and 204.

The CPR board 166 also includes a first slot 210 and a second slot 212. Each of the slots 210 and 212 can provide a hand hold or handle for a caregiver to remove the CPR 166 board from the footboard 164. For instance, to remove the CPR board 166 from the footboard 164, a caregiver can use the first slot 210 and/or second slot 212 to pull up on the footboard and to remove the footboard from the receptacle. The first slot 210 and second slot 212 can then be used to move the CPR board 166 to a substantially horizontal position to enable placement of the CPR board beneath a patient so that the cardiopulmonary resuscitation can be performed. To enable sliding of the CPR board beneath a supine patient, the thickness of the CPR board can be approximately one-quarter of an inch (¼") up to and including approximately one-half of an inch (½"). Other dimensions are also possible. Once the CPR board has been placed under a patient and is subsequently removed, the caregiver can use the first slot 210 and/or the second slot 212 to remove the board from beneath the patient for reinsertion into the receptacle 190.

While this invention has been described with specific embodiments thereof, alternatives, modifications and variations may be apparent to those skilled in the art. Accordingly, it is intended to embrace all such alternatives, modifications and variations that fall within the spirit and broad scope of the claims.

The invention claimed is:

1. A bed comprising a frame having a head end and a foot end, a mattress supported on the frame, a headboard coupled to the frame adjacent the head end, the headboard extending upwardly from the frame beyond an upper surface of the mattress, and a line management device coupled directly to the headboard and extending upwardly therefrom, the line management device being supported by the headboard and spaced from the frame, the line management device being configured with a plurality of channels to receive therein patient care lines.

2. The bed of claim 1, wherein the frame includes a base frame and an intermediate frame supported above the base frame and wherein the headboard is coupled to the intermediate frame.

3. The bed of claim 2, wherein the headboard includes first and second couplers that are inserted into receptacles located on the intermediate frame.

4. The bed of claim 3, wherein the headboard includes an aperture overlying the first coupler and the line management device has a projection that is received in the aperture.

5. The bed of claim 1, wherein the frame includes an articulating deck, the articulating deck includes a head section that is movable between a raised position and a lowered positions, and the headboard is coupled to the head section.

6. The bed of claim 1, wherein the line management device comprises a first line management device and further comprising a second line management device coupled to the headboard.

7. The bed of claim 6, wherein the headboard has a first side adjacent one side of the frame and a second side adjacent an opposite side of the frame, the first line management device is coupled to the first side of the headboard, and the second line management device is coupled to the second side of the headboard.

8. The bed of claim 1, wherein the headboard includes first and second couplers that are inserted into receptacles located on the frame.

9. The bed of claim 8, wherein the first and second couplers comprise respective first and second brackets each having a slot adapted for receipt of a patient restraint strap.

10. The bed of claim 1, wherein the line management device includes four fingers extending upwardly from a base portion.

11. The bed of claim 10, wherein an upper end of each of the fingers includes an extending portion which extends toward an adjacent finger such that a corresponding gap is defined between each adjacent pair of extending portions.

12. The bed of claim 1, wherein the headboard has an aperture and the line management device comprises a base portion, a plurality of fingers extending upwardly from the base portion and a neck extending downwardly from the base portion for receipt in the aperture.

13. The bed of claim 12, wherein the aperture comprises a non-round aperture.

14. The bed of claim 13, wherein the aperture comprises an elongated curved aperture.

15. The bed of claim 12, wherein the neck is formed to fit snugly within the aperture.

16. The bed of claim 1, wherein the headboard includes a detachable CPR board.

17. The bed of claim 16, wherein the headboard includes a receptacle and the CPR board is removably received in the receptacle.

18. The bed of claim 16, wherein a top of the CPR board is higher in elevation than the line management device when the CPR board is received in the receptacle.

19. The bed of claim 16, wherein the line management device comprises a first line management device, further comprising a second line management device coupled to the headboard, and wherein the detachable CPR board is situated between the first and second line management devices.

20. The bed of claim 19, wherein the headboard includes a first aperture for receipt therein of a first portion of the first line management device, a second aperture for receipt therein of a second portion of the second line management device, and a receptacle for receipt therein of a third portion of the CPR board.

* * * * *